UNITED STATES PATENT OFFICE

2,080,363

UNVULCANIZED AND VULCANIZED COMPOSITIONS

Paul Stöcklin, Opladen, and Erich Konrad, Leverkusen-I. G. Werk, Germany, assignors to I. G. Farbenindustrie Aktiengesellschaft, Frankfort-on-the-Main, Germany No Drawing. Application December 26, 1934, Serial No. 759,314. In Germany December 30, 1933

11 Claims. (Cl. 260—2)

This invention relates to unvulcanized and vulcanized compositions comprising a synthetic rubber and high molecular sulfur-containing compounds.

The prior application Serial No. 531,612 filed April 20, 1931 of Erich Konrad et al. now Patent No. 1,973,000, issued Sept. 11, 1934, describes the products of the conjoint polymerization of dienes of the type of butadiene and isoprene with unsaturated nitriles of the general formula:—

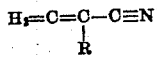

wherein R means hydrogen or alkyl. The vulcanizates obtained from the said mixed polymerization products are distinguished by excellent mechanical properties, especially by an extremely high resistance towards abrasion. Another valuable property of these vulcanizates is their resistance to the swelling action of organic solvents, such as benzine, oils and so on, which is the better the higher the content of acrylic acid nitrile is (for instance, about 40%), and which is far superior to the swelling resistance of the best hitherto known vulcanizates of natural rubber.

It is the object of the present invention to effect a further increase of the said valuable properties of the above described polymerizates. This problem has been solved by adding to the unvulcanized mixed polymerization products high molecular sulfur-containing condensation products, which are obtainable from a low molecular, aliphatic polyhalogenated compound, and alkali-, ammonium- or earthalkali sulfides or polysulfides. Condensation products of the latter type may be obtained, for example, by reacting with an alkali sulfide upon dihalogen derivatives of low molecular aliphatic hydrocarbons such as ethylene chloride, it being the preferred form of our invention to employ such condensation products as are obtainable by the reaction of polysulfides with low molecular aliphatic alcohols or ethers which contain at least two halogen atoms linked to different carbon atoms, or, in case the ether group forms an ethylene oxide linkage, contain at least one halogen atom. As examples for low molecular aliphatic hydrocarbons there may be mentioned, besides ethylene dichloride and polyhalogenated alcohols and ethers of the character described, the ester of glycerol and chloroacetic acid, dichloroacetone, all of which upon the action of water soluble sulfides or polysulfides yield soft to plastic high molecular sulfur containing reaction products. It is to be understood that the term "polyhalogenated aliphatic compound" used in the claims of this case is intended to embrace every halogenated compound which has halogen atoms in an aliphatic linkage, the use of compounds of the type of (di)-chloromethylbenzene or of benzalchloride or of epichlorohydrine falling within the scope of the present invention.

The addition of these condensation products results in an increased plasticity of the polymerizates and in consequence thereof in a facilitation of the handling and rolling of the same. Even the high swelling resistance towards benzines, oils and so on of the polymerization products is further increased to a far reaching extent. On the other hand, the polymerizates in question display an excellent capability of taking up the sulfur-containing condensation products thus permitting the rubber industry the utilization of such products which, when taken alone are not suitable for all purposes on account of their lack of physical properties. We wish to point out that in spite of the known high swelling resistance of the sulfur-containing condensation products, the effect produced by the present process could by no means be foreseen, since the said sulfur-containing condensation products if combined with natural rubber are not capable of yielding a satisfactory swelling resistance without impairing the good physical properties of the natural rubber.

The amount of the sulfur-containing plastic condensation products to be added may be varied, depending on the strength and elasticity or on the swelling resistance required from the goods to be manufactured. For example, good results are obtained by using the condensation product in an amount of about 10–70% (calculated on the total amount of the mixture). The plastic masses may be incorporated within the polymerizates in any desired manner. For example, the polymerizate may be mixed homogeneously on the mill with the plastic product while subsequently adding the filling agents, or the ready prepared mixtures of both components may be mixed; it is also possible to add the necessary amount of the plastic condensation product to the ready-prepared mixture of the mixed polymerizate without a further addition of filling agents. Furthermore, the emulsions of both components may be mixed with each other and the mixture subsequently caused to coagulate. Obviously, also mixtures of different condensation products may be united with the mixed polymerizate.

Vulcanizates obtained from the above described products are distinguished, besides an exceedingly good resistance towards swelling, by excellent physical properties (tensile strength, elongation and resiliency) and we wish to point out that the same or similar effects cannot be obtained by a combination of natural rubber with the above described plastic materials.

The following examples illustrate the invention, without, however, restricting it thereto, the parts being by weight:—

Example 1

100 parts of a mixed polymerizate of 75% of butadiene and 25% of acrylic acid nitrile are rolled on the mixing rollers with 100 parts of a condensation product from ethylene-dichloride and sodium polysulfide being tough-plastic at ordinary temperature. This mixture is then vulcanized with the addition of

|   | Parts |
|---|---|
| Lamp black | 50 |
| Zinc oxide | 20 |
| Mercaptobenzothiazole | 1 | for 50 minutes at 3 atmospheres (superatmospheric) pressure. The vulcanizates thus obtained show a tensile strength of about 130–150 kg./cm.² and a good resiliency. The swelling in benzine, measured by the increase in weight, amounts after some days to about 2%.

When increasing the nitrile content in the polymerization product the resistance of swelling is still further improved.

Example 2

130 parts of a mixed polymerizate obtained from butadiene and acrylic or methacrylic acid nitrile are mixed with 70 parts of a soft condensation product obtainable by the reaction of epichlorohydrine with sodium polysulfide.

When vulcanizing the mixture thus obtained together with

|   | Parts |
|---|---|
| Iron oxide, red | 50 |
| Zinc oxide (active) | 20 |
| Stearic acid | 1 |
| Sulfur | 2 |
| Mercaptobenzothiazole | 1 | for 60 minutes at 3 atmospheres (superatmospheric) pressure, vulcanizates of excellent soft-rubber-like properties are obtained, which are distinguished by an outstanding resistance towards swelling.

Instead of the condensation product obtained from epichlorohydrine and sodium polysulfide there can be used a polysulfide condensation product of dichloroacetone or the acetal of formaldehyde and beta-chloro-ethylalcohol.

Example 3

100 parts of a mixed polymerizate obtainable from butadiene and acrylic acid nitrile are rolled on the mixing rollers together with 30 parts of a condensation product obtainable from beta-beta'-dichlorodiethylether with sodium tetrasulfide and 70 parts of another condensation product obtainable from glycerine dichlorohydrine and sodium tetrasulfide. A tough-plastic mass is thus obtained which is easily workable and can be rolled to smooth sheets.

A vulcanization mixture is prepared from:—

|   | Parts |
|---|---|
| Butadiene-acrylic-acid-nitrile mixed polymerizate | 100 |
| Condensation product above described | 100 |
| Lamp black | 50 |
| Zinc oxide (active) | 10 |
| Stearic acid | 1 |
| Sulfur | 2 |
| Mercaptobenzothiazole | 1 | which is heated for 50 minutes at 3 atmospheres (superatmospheric) pressure. The vulcanizates obtained show a good tensile strength and a high resiliency. The increase of weight in benzine amounts after some days to less than 2%.

Example 4

100 parts of a mixed polymerizate from butadiene and acrylic acid nitrile are intimately mixed on the rollers with 50 parts of a condensation product from glycerine dichlorohydrine and sodium tetrasulfide and 50 parts of a condensation product from beta-beta'-dichlorodiethylether with sodium tetrasulfide. A plastic sticky mixture is obtained which is very easily workable. When vulcanizing this mixture as described in Example 2, vulcanizates of especially good elasticity and swelling resistance are obtained.

Example 5

100 parts of a mixed polymerizate obtained by the conjoint emulsion polymerization of 40 parts of acrylic acid nitrile and 60 parts of butadiene are intimately mixed on the rollers with 100 parts of the condensation product from glycerine-dichlorohydrine and sodium monosulfide. The mixture thus obtained is easily workable and yields vulcanization products of good elasticity and swelling resistance.

We claim:—

1. The composition of matter comprising a product of the conjoint polymerization of unsaturated hydrocarbons selected from the group consisting of butadiene and isoprene with a nitrile selected from the group consisting of acrylnitrile and methacrylnitrile and a high molecular sulfur-containing product of the condensation of a water soluble sulfide and a polyhalogenated aliphatic compound.

2. The composition of matter comprising a product of the conjoint polymerization of unsaturated hydrocarbons selected from the group consisting of butadiene and isoprene with a nitrile selected from the group consisting of acrylnitrile and methacrylnitrile and a high molecular sulfur-containing product of the condensation of a water soluble polysulfide and a polyhalogenated aliphatic compound.

3. The composition of matter as claimed in claim 1, in which the sulfur containing condensation product is present in an amount of between about 10 and about 70% (calculated on the total amount of the mixture).

4. The composition of matter comprising a product of the conjoint polymerization of unsaturated hydrocarbons selected from the group consisting of butadiene and isoprene with a nitrile selected from the group consisting of acrylnitrile and methacrylnitrile and a high molecular sulfur-containing product of the condensation of a water soluble sulfide and a polyhalogenated aliphatic oxygen-containing compound.

5. The composition of matter as claimed in claim 4, in which a sulfur-containing condensation product of a water soluble sulfide with beta-beta'-dichloro-diethylether is employed.

6. The composition of matter comprising a product of the conjoint polymerization of butadiene with a nitrile selected from the group consisting of acrylnitrile and methacrylnitrile and the product of the condensation of a polyhalogenated aliphatic compound and a water soluble polysulfide selected from the group consisting of alkali-, ammonium- and earthalkali polysulfides.

7. The composition of matter comprising a product of the conjoint polymerization of butadiene and acrylnitrile and a condensation product of beta-beta'-dichloro-diethylether with a water soluble sulfide and a condensation product of glycerine dichlorohydrine with a water soluble sulfide.

8. Vulcanizable mixtures containing besides vulcanization accelerators and filling agents as the rubber ingredient a mixture of a product of the conjoint polymerization of butadiene or isoprene with acrylnitrile or methacrylnitrile and a condensation product of a water soluble sulfide with a polyhalogenated aliphatic compound.

9. Vulcanizable mixtures containing besides vulcanization accelerators and filling agents as the rubber ingredient a mixture of a product of the conjoint polymerization of butadiene with acrylnitrile and a condensation product of a water soluble sulfide with beta-beta'-dichlorodiethylether.

10. Vulcanizates obtainable by vulcanizing the mixture as claimed in claim 8.

11. Vulcanizates obtainable by vulcanizing the mixture as claimed in claim 9.

PAUL STÖCKLIN.
ERICH KONRAD.